O. J. BOLLINGER.
Water-Wheels.

No. 140,401.                                Patented July 1, 1873.

Witnesses:                                  Inventor:
E. Wolff.                                   O. J. Bollinger
C. Sedgwick                             Per
                                            Attorneys.

UNITED STATES PATENT OFFICE.

OLIVER J. BOLLINGER, OF YORK, PENNSYLVANIA.

IMPROVEMENT IN WATER-WHEELS.

Specification forming part of Letters Patent No. 140,401, dated July 1, 1873; application filed May 24, 1873.

*To all whom it may concern:*

Figure 1:
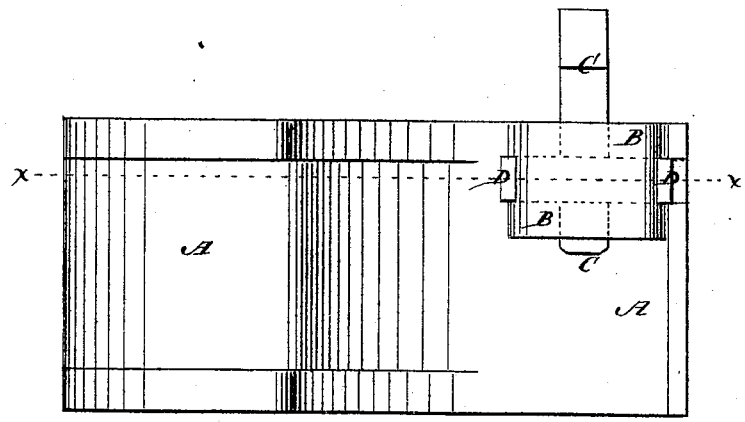
Figure 2:
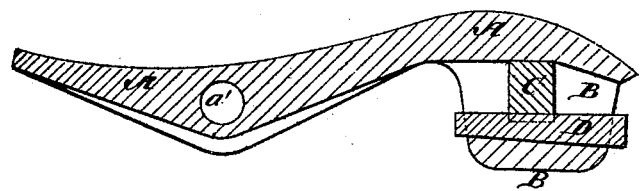
Figure 3:
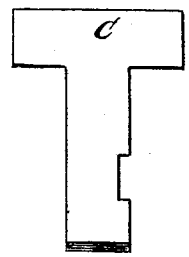

Be it known that I, OLIVER J. BOLLINGER, of York, in the county of York and State of Pennsylvania, have invented a new and useful Improvement in Water-Wheels, of which the following is a specification:

Figure 1 is a detail view of a water-wheel gate illustrating my improvement. Fig. 2 is a detail sectional view of the same taken through the line $x\ x$, Fig. 1. Fig. 3 is a detail view of the stud.

Similar letters of reference indicate corresponding parts.

My invention relates to that class of water-wheels with which hinged or pivoted gates are used; and has for its object to remedy the difficulties arising from the manner in which the studs are formed and secured to the gates. The invention consists in the lug of a pivoted or hinged gate of a water-wheel, made with a vertical hole to receive the stud, and a transverse hole to receive the wedge-key; and in the cross-headed stud, made with a transverse notch to receive the key for securing it detachably to the lug B of the pivoted or hinged gate of the water-wheel, as hereinafter fully described.

Heretofore the studs have been tapped into the gates, and, when a breakage occurred, the piece screwed into the gate or lug could be removed only by an expert workman.

A represents a gate, and $a'$ is the hole for the pivot. B is a lug cast upon the gate A, and through which is formed a vertical hole to receive the stud C. The lug B has, also, a hole formed through it at right angles with the stud-hole to receive the wedge-key D, which is driven along the inner surface of said lug, and through a transverse notch formed in the side of the stud C, as shown in Figs. 1 and 2.

By this construction should the stud C break the pieces can be readily removed by knocking out the wedge-key D, and a new stud inserted.

The upper end of the stud C has a cross-head formed upon it, as shown in Fig. 3, to allow of chipping to fit it in place in such a way as to correct any irregularity in opening and closing the gates, so that they may all close evenly and regularly.

By this construction the weakening of the studs by chipping or filing their sides in fitting them is avoided.

Having thus described my invention, I claim as new and desire to secure by Letters Patent—

1. The lug B of a pivoted or hinged gate of a water-wheel, made with a vertical hole to receive the stud, and a transverse hole to receive the wedge-key, substantially as herein shown and described.

2. The cross-headed stud C, made with a transverse notch to receive the key D for securing it detachably to the lug B of the pivoted or hinged gate of a water-wheel, substantially as herein shown and described.

OLIVER J. BOLLINGER.

Witnesses:
R. L. SHELTER,
W. H. MCCLELLAN.